(12) United States Patent
Chen (10) Patent No.: US 9,505,275 B2
(45) Date of Patent: Nov. 29, 2016

(54) TIRE/WHEEL STRUCTURE

(71) Applicant: Cheng-Tung Chen, New Taipei (TW)

(72) Inventor: Cheng-Tung Chen, New Taipei (TW)

( * ) Notice: Subject to any disclaimer, the term of this patent is extended or adjusted under 35 U.S.C. 154(b) by 434 days.

(21) Appl. No.: 14/081,111

(22) Filed: Nov. 15, 2013

(65) Prior Publication Data

US 2014/0261946 A1   Sep. 18, 2014

(30) Foreign Application Priority Data

Mar. 18, 2013   (TW) .............................. 102204933 U (51) Int. Cl.
*B60C 13/02*   (2006.01)
*B60C 19/00*   (2006.01)

(52) U.S. Cl.
CPC ............... *B60C 13/02* (2013.01); *B60C 19/00* (2013.01)

(58) Field of Classification Search
CPC ..... B60C 13/02; B60C 13/023; B60C 11/01; B60C 2011/013
USPC ...................................................... 244/103 S
See application file for complete search history.

(56) References Cited

U.S. PATENT DOCUMENTS

| | | | | |
|---|---|---|---|---|
| 3,568,747 A | * | 3/1971 | Fletcher ................... | B60C 11/01 152/154 |
| 5,213,285 A | * | 5/1993 | Stanko ..................... | B64C 25/40 244/103 S |
| 5,259,431 A | * | 11/1993 | Housiaux ................ | B60C 13/02 152/523 |
| 2010/0038001 A1 | * | 2/2010 | Yamaguchi ......... | B60C 11/0309 152/153 |
| 2010/0180994 A1 | * | 7/2010 | Yamaguchi ............. | B60C 11/01 152/153 |

FOREIGN PATENT DOCUMENTS

| TW | 254216 | 8/1995 |
|---|---|---|
| TW | I262859 | 10/2006 |
| TW | M362122 | 8/2009 |
| TW | 201040041 | 11/2010 |

* cited by examiner

*Primary Examiner* — Justin Fischer
*Assistant Examiner* — Robert Dye
(74) *Attorney, Agent, or Firm* — Rosenberg, Klein & Lee (57) ABSTRACT

A tire/wheel structure includes a body, such as an automobile tire, and guide blocks mounted to two sidewalls of the body in a circumferentially arranged cascade series. Each guide block has a side facing a forward rotation direction of the body and forming at least one inclined guide face in such a way that the inclined guide face and an adjacent one of the guide blocks define therebetween a wind-assisting groove, whereby when the body is in a forward rotating condition, the inclined guide faces of the guide blocks and the wind-assisting grooves help enhance airflow guiding, reduce wind resistance, and generating an assistive driving force and when the inclined guide faces of the guide blocks and the wind-assisting grooves are moved to a position in a lower half of the circumference of the body, a follow-the-trend driving assisting force and a moving stabilizing effect are achieved.

5 Claims, 9 Drawing Sheets

TIRE/WHEEL STRUCTURE

BACKGROUND OF THE INVENTION

1. Field of the Invention

The present invention relates to a tire/wheel structure, and in particular to a tire or a wheel that serves as a driving tire or wheel of a vehicle and comprises a plurality of guide blocks and airflow-assisting grooves to enhance airflow guide, reduce wind resistance, and generate an assistive driving force in a forward rotation direction of the tire or wheel.

2. The Related Arts

A tire has a tread on which a complicated pattern of tread blocks is formed to improve grip and slipperiness resistance. This inevitably induces an increased friction resistance and wind resistance on the tire. A negative effect may result for the forward rotation of the tire. Further, for long term driving of an automobile, more consumption of fuel and energy may result. For the contemporary era when energy conservation is desired, such a conventional tire structure may cause an additional burden of fuel consumption of the automobile.

Prior art patent documents of the field are available, such as Taiwan Utility Model M362122, which discloses a carbon fiber wheel rim that reduces sideway wind resistance, Taiwan Patent No. 1262859, which discloses an enhanced improvement of a piercing-resistant and explosion resistant rim of tire, and Taiwan Utility Model 254216, which discloses a novel wheel rim. They all provide modifications of the structures of automobile wheel rims or tires and generally for the purposes of reducing wind resistance or generating a movement-assisting effect. However, such modifications may not be applicable to all kinds of vehicle, for the disk brakes or drum brakes of automobiles available from different manufacturers may not be exactly the same. For example, some models of automobile may not allow for any projections or recesses formed outside or inside a rim in order to avoid interference with the disk brakes or drum brakes, which may lead to being unable to install properly. Further, such known patent documents require the rims to be replaced or modified. The cost for manufacture, replacement, and maintenance may be excessively high, making it not economic for industrial use, and further, surfaces of the wheel or the rim of these known patent documents that can help reducing wind resistance and providing assistance for forward moving are limited to the two side surfaces and such effects cannot be provided by the tread surface of the wheel or tire.

Further, Taiwan Patent Publication No. 201040041, which discloses a combination of "daughter tire and mother tire". Such a combination provides an advantage of individually replacing either the daughter tire or the mother tire for whichever that has been worn out. However, it provides no help in reducing tire wind resistance and fuel saving.

SUMMARY OF THE INVENTION

A primary object of the present invention is to provide a tire/wheel structure that overcomes the problems or drawbacks of a conventional tire being subjected to high frictional force, high wind resistance, and high fuel consumption in the forward rotating direction.

Thus, the present invention provides a tire/wheel structure, which comprises a body and a plurality of guide blocks, wherein the body can be an automobile tire and the guide blocks are mounted to at least one of two sidewalls of the body in a cascade series arranged in a circumferential direction, each of the guide blocks having a side facing a forward rotation direction of the body and forming at least one inclined guide face in such a way that the inclined guide face and an adjacent one of the guide blocks define therebetween a wind-assisting groove, whereby when the body is in a forward rotating condition, the inclined guide faces of the guide blocks and the wind-assisting grooves help enhance airflow guiding, reduce wind resistance, and generating an assistive driving force and when the inclined guide faces of the guide blocks and the wind-assisting grooves are moved to a position in a lower half of the circumference of the body, a follow-the-trend driving assisting force and a moving stabilizing effect are achieved so that an assistive driving force can be induced in the forward rotation direction of the body to thus constitute a tire/wheel structure featuring assisted airflow guiding and assistive driving force.

The efficacy of the tire/wheel structure of the present invention is that the arrangement of the guide blocks distributed along a circumference of the body, the inclined guide faces, the wind-assisting grooves achieves the effect of enhancing airflow guiding, reducing wind resistance, and generating an assistive driving force during forward rotation of the tire/wheel so as to greatly reduce fuel consumption and power consumption in forward traveling of a vehicle, so that an effect of fuel saving and energy saving can be achieved for both new and old vehicles. This may help greatly reduce consumption of energy and make a contribution to energy saving for saving the energy exhausting Earth. Further, replacement of wheel or tire is not necessary. The present invention is not constrained to any specific brake system of a specific brand of automobile and is not constrained to applications to new or used automobiles to provide a substantial effect of reducing fuel consumption or power consumption of the automobiles. No expensive cost for manufacture, replacement, and maintenance of tires or wheels is needed, making it economic.

BRIEF DESCRIPTION OF THE DRAWINGS

The present invention will be apparent to those skilled in the art by reading the following description of preferred embodiments thereof, with reference to the attached drawings, wherein.

DETAILED DESCRIPTION OF THE PREFERRED EMBODIMENTS

Figure 1:
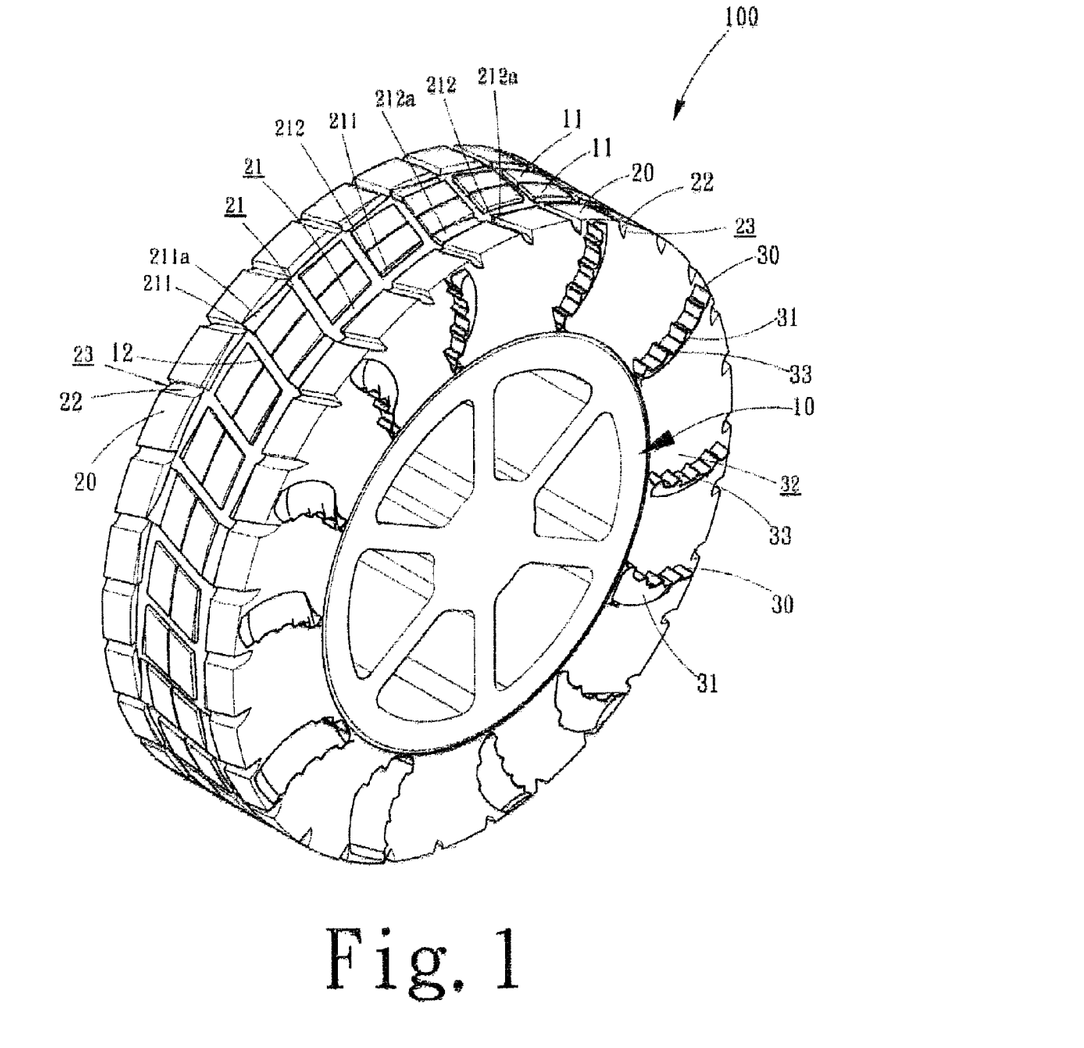
FIG. 1 is a perspective view showing a tire/wheel structure according to a first embodiment of the present invention.
Figure 2:
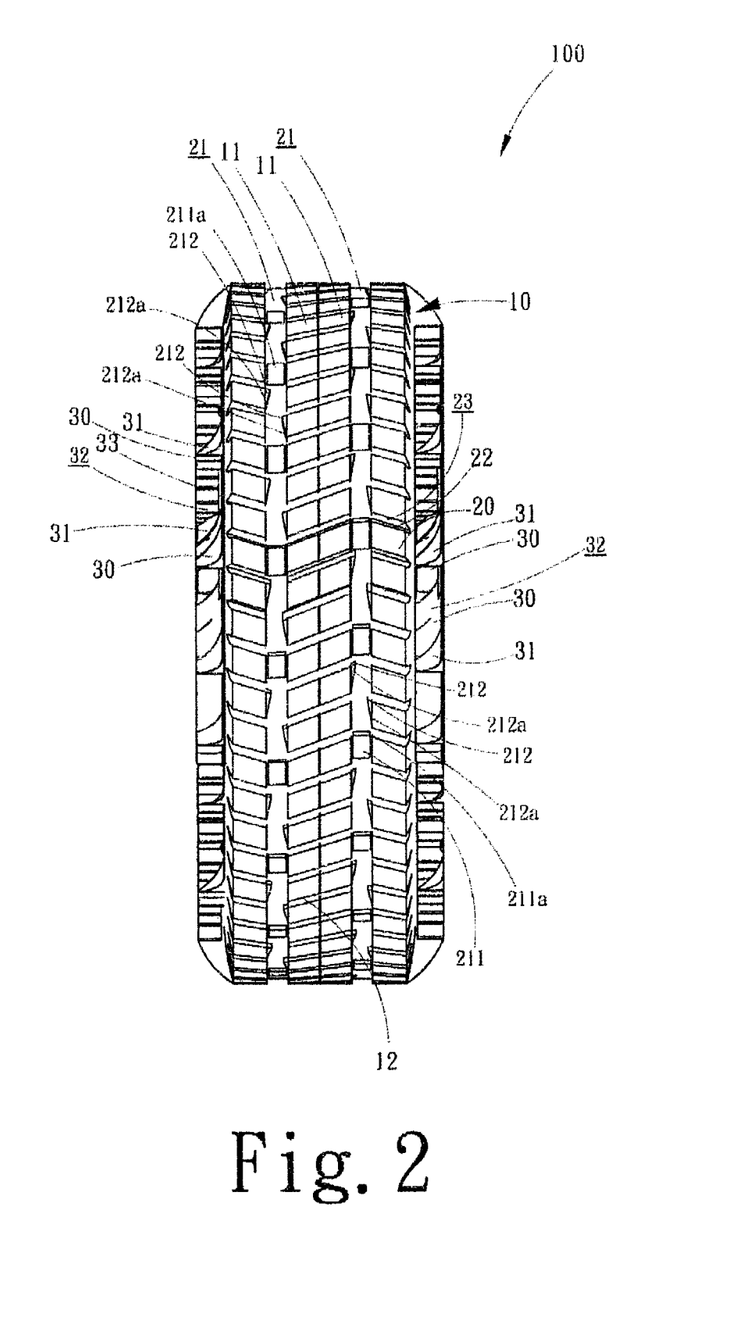
FIG. 2 is a front view of FIG. 1.
Figure 3:
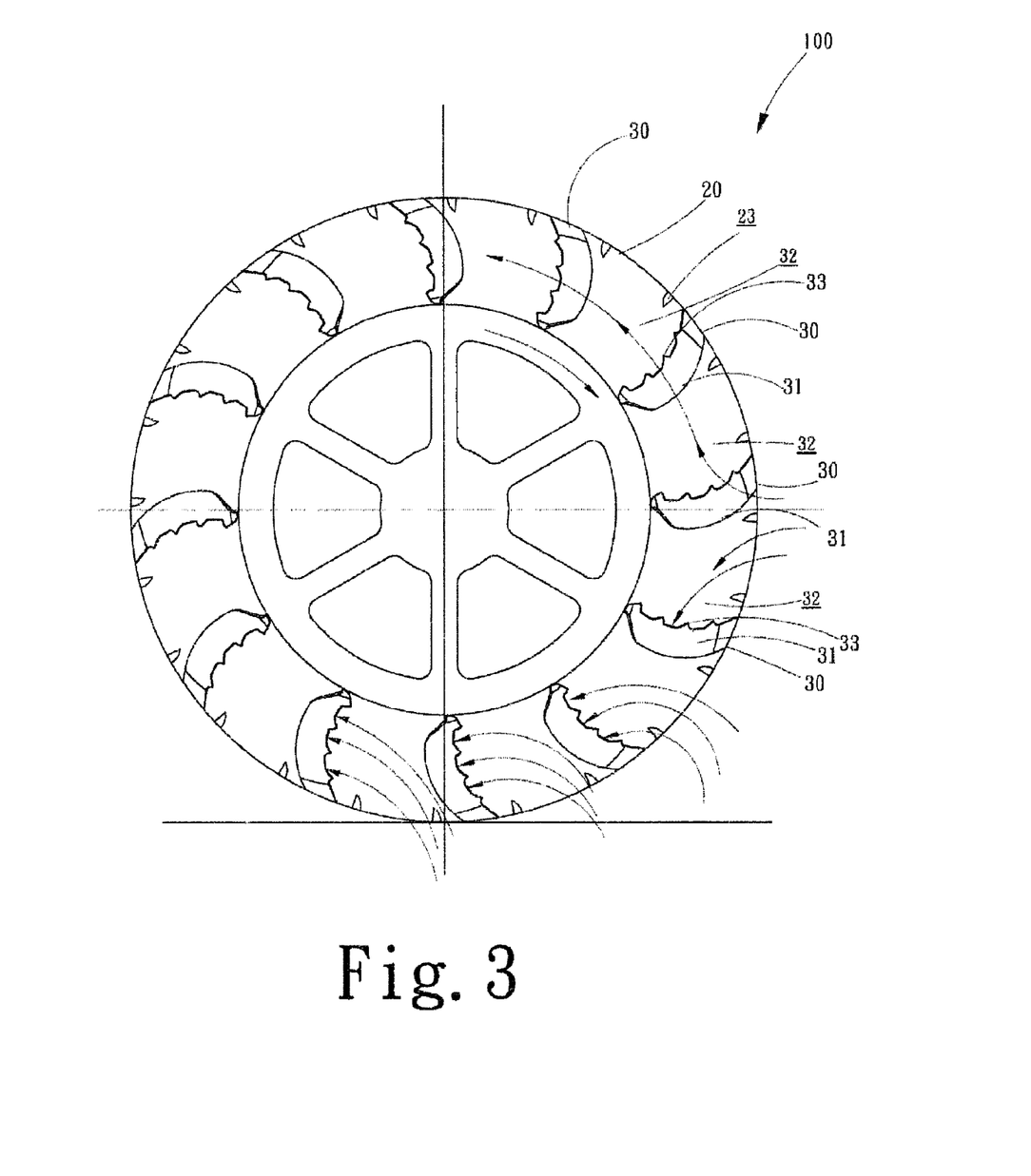
FIG. 3 is a side elevational view of FIG. 1.

With reference to the drawings and in particular to FIGS. 1-3, a tire/wheel structure constructed in accordance with a first embodiment of the present invention and generally designated at 100 comprises a body 10. The body 10 can be for example an automobile tire. The body 10 comprises a plurality of tread blocks 11, which is mounted to a tread surface 12 of the body 10 in cascade series arranged in a circumferential direction. The tread blocks 11 can be of any desired shape and arrangements, which are not limited to any specific ones. In the present invention, rectangular blocks are taken as an example for the following illustration, but it is appreciated by people having ordinary skills that the shapes and arrangements of the tread blocks may be varied from tire model to tire model and from tire manufacturer to tire manufacturer.

A plurality of guide blocks 20, 30 is mounted to at least one of two sidewalls of the body 10 in a cascade series arranged in a circumferential direction. In the present invention, two cascade series of guide blocks respectively mounted to the two sidewalls of the body 10 and thus located on opposite sides of the tread blocks 11 are taken as an example for illustrated. It is appreciated that the guide blocks 20, 30 are not limited to any specific shape and in the present invention, a trapezoidal shape and a wing-like shape are taken as examples for the guide blocks in the following illustration. The guide blocks 20 and the tread blocks 11 define therebetween assistive airflow channels 21. Each of the guide blocks 20, 30 is provided, on a side thereof facing a forward rotation direction of the body 10, with at least one inclined guide face 22, 31. The inclined guide face 22, 31 can be of any desired shape, which is not limited to any specific shape. In the present invention, a curve slope and a straight slope are taken as examples for illustration. The inclined guide face 21 of each of the guide blocks 30 and an adjacent one of the guide blocks 20 define therebetween a wind-assisting groove 23 and similarly, the inclined guide face 31 of each of the guide blocks 30 and an adjacent one of the guide blocks 30 define therebetween a wind-assisting groove 32, whereby when the body 10 is in a forward rotation condition (as shown in FIG. 3), the inclined guide faces 22, 31 and the wind-assisting grooves 23, 32 of the guide blocks 20, 30 conduct and guide of airflows, reduce wind resistance, and generating a move-assisting force. Further, the inclined guide faces 22 and the wind-assisting grooves 23 of the guide blocks 20 may induce a follow-the-trend driving assisting force and a moving stabilizing effect. The number of the guide blocks 30 and the number of series of the guide blocks 30 are not limited to any specific figures. In the present invention, a single series of the guide blocks 30 that is arranged to be concentric with respect to the tire is taken as an example for illustration and such a series of guide blocks 30 is formed on each sidewall of the body 10. Further, each of the guide blocks 30 is provided, on a rear face thereof, with a plurality of wind assisting protrusions 33, which provides an increase surface area and an associated effect for wind-assisted driving.

Figure 4:
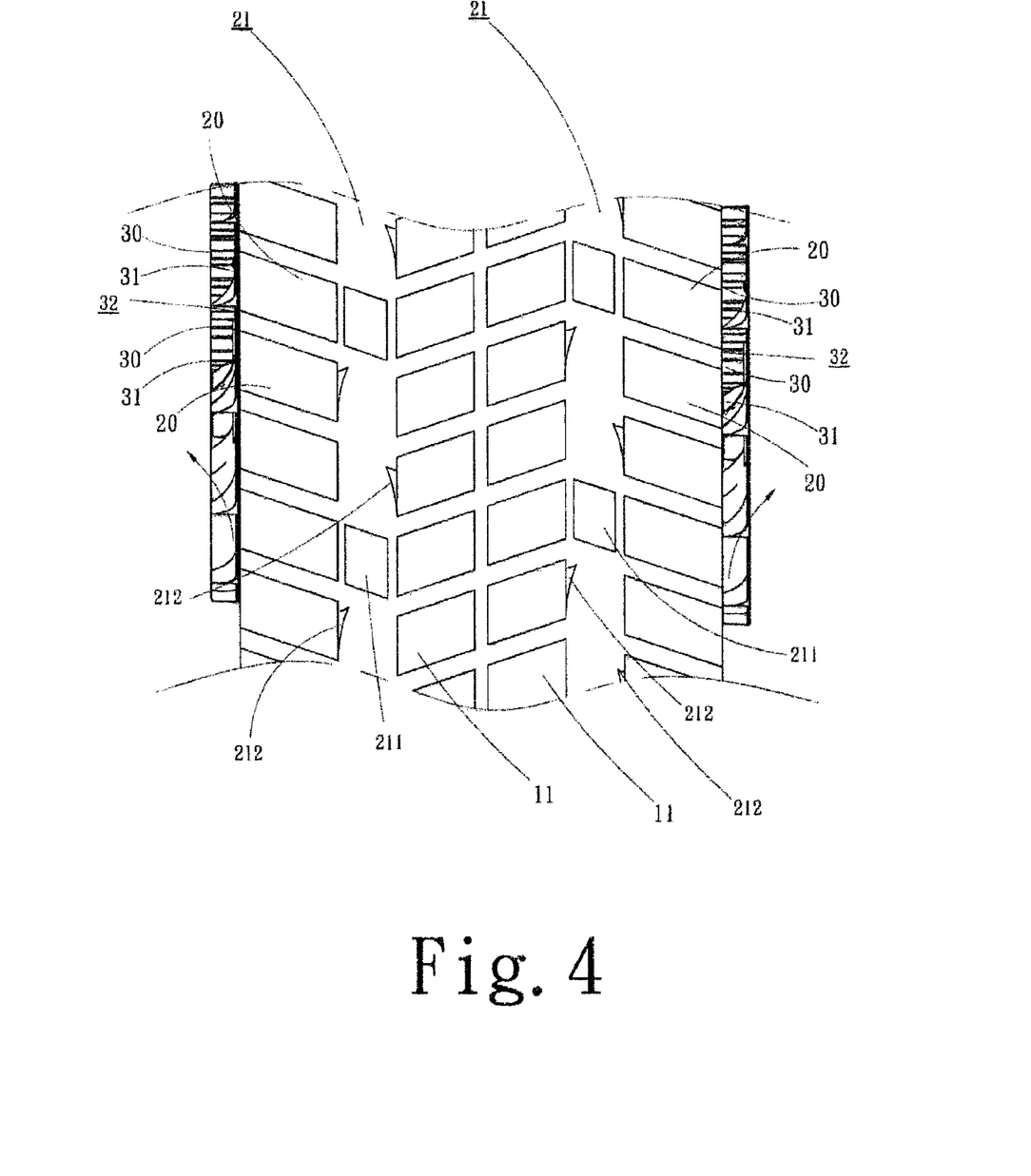
FIG. 4 a partly enlarged view showing an arrangement of first ancillary guide blocks and second ancillary guide blocks in assistive airflow channels.

Referring to FIG. 4, a plurality of first ancillary guide blocks 211 and second ancillary guide blocks 212 is provided in the assistive airflow channels 21 defined between the tread blocks 11 of the body 10 and the guide blocks 20. The first ancillary guide blocks 211 and the second ancillary guide blocks 212 can be arranged in any desired form and are not limited to any specific arrangement. In the present invention, the ancillary guide blocks 211 are directly mounted to a bottom surface of each of the assistive airflow channels 21, while the second ancillary guide blocks 212 are mounted, respectively, to two side surfaces of each of the assistive airflow channel 21. Each of the first ancillary guide blocks 211 is provided, on a side thereof facing a forward rotation direction of the body 10, with an inclined guide face 211*a*; and each of the second ancillary guide blocks 212 is provided, on a side thereof facing the forward rotation direction of the body 10, with an inclined guide face 212*a*. Similarly, the inclined guide faces 211*a* of the first ancillary guide blocks 211 and the inclined guide faces 212*a* of the second ancillary guide blocks 212 may induce, collectively with the assistive airflow channels 21, an effect of enhancing airflow guide, reducing wind resistance, and generating an assistive driving force. When the inclined guide faces 211*a* of the first ancillary guide blocks 211 and the inclined guide faces 212*a* of the second ancillary guide blocks 212 are rotated to a position on a lower half of the circumference of the body, they may induce a follow-the-trend driving assisting force and a moving stabilizing effect.

Figure 5:
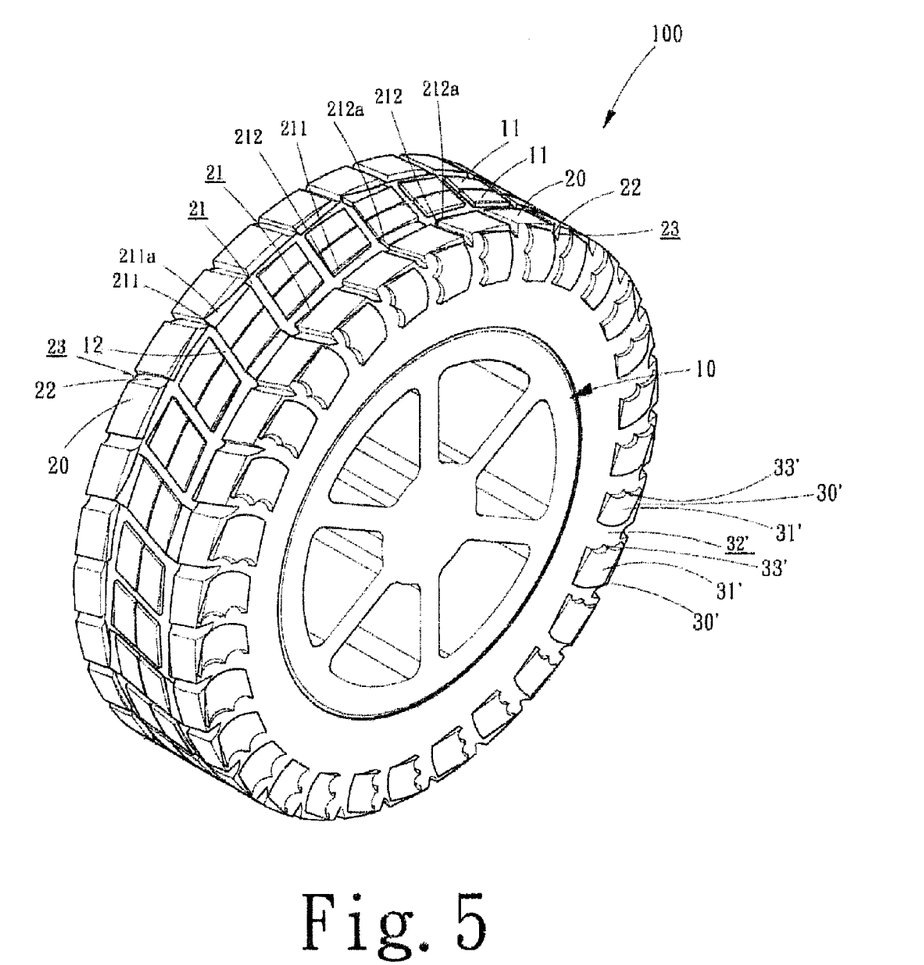
FIG. 5 is a perspective view showing a tire/wheel structure according to a second embodiment of the present invention.

Referring to FIG. 5, a tire/wheel structure constructed in accordance with a second embodiment of the present invention, also designated at 100, is shown, in which the guide blocks 30' is made in the form of an arrow-like configuration and are arranged in a single series and in a one-by-one neighboring manner on each of two sidewalls of the body 10. Each of the guide blocks 30' is provided, on a side thereof facing the forward rotation direction of the body 10, with at least one inclined guide face 31', such that the inclined guide face 31' of each of the guide blocks 30' and an adjacent one of the guide blocks 30' define therebetween a wind-assisting groove 32' and each of the guide blocks 30' is provided, on a rear side thereof, with a wind assisting protrusion 33' to provide multiple sections of surface area and an associated effect for wind-assisted driving.

The guide blocks 20, 30, 30' and the first ancillary guide blocks 211, the second ancillary guide blocks 212 can be mounted to the body 10 in any desired manner, being not limited to any specific way. In the present invention, integral formation with the body 10 is taken as an example for illustration. The guide blocks 20, 30, 30', the first ancillary guide blocks 211, and the second ancillary guide blocks 212 can be arranged on the body 10 in any desired manner, being not limited to any specific way. Any way of forming different forms of arrangement or any equivalent structure that replaces the tread block 11 of the body 10 with the guide blocks 20, 30, 30', the first ancillary guide blocks 211, or the second ancillary guide blocks 212, any way of arranging the guide blocks 20, 30, 30', the first ancillary guide blocks 211, or the second ancillary guide blocks 212 in recesses or water release grooves of the tread pattern of a tire is considered within the scope of the present invention.

Figure 6:
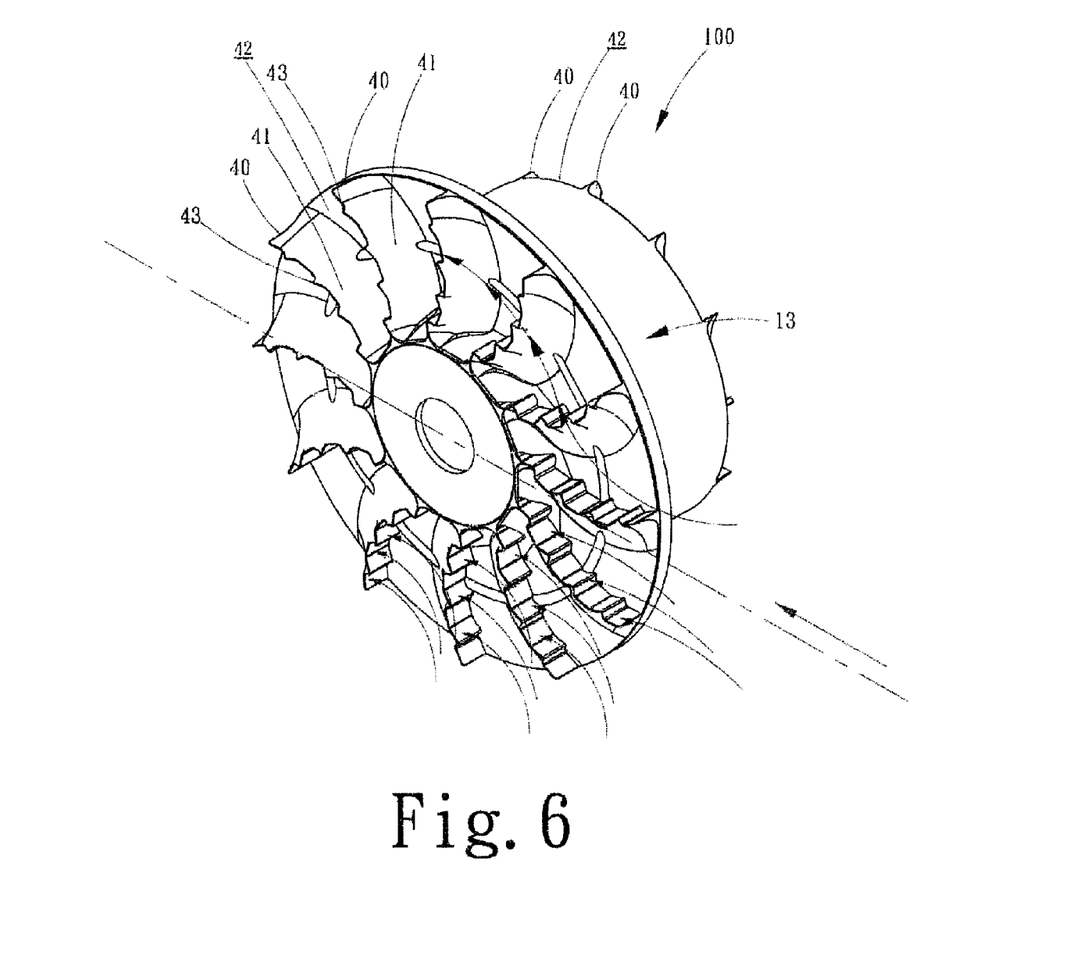
FIG. 6 is a perspective view showing a tire/wheel structure according to a third embodiment of the present invention.
Figure 7:
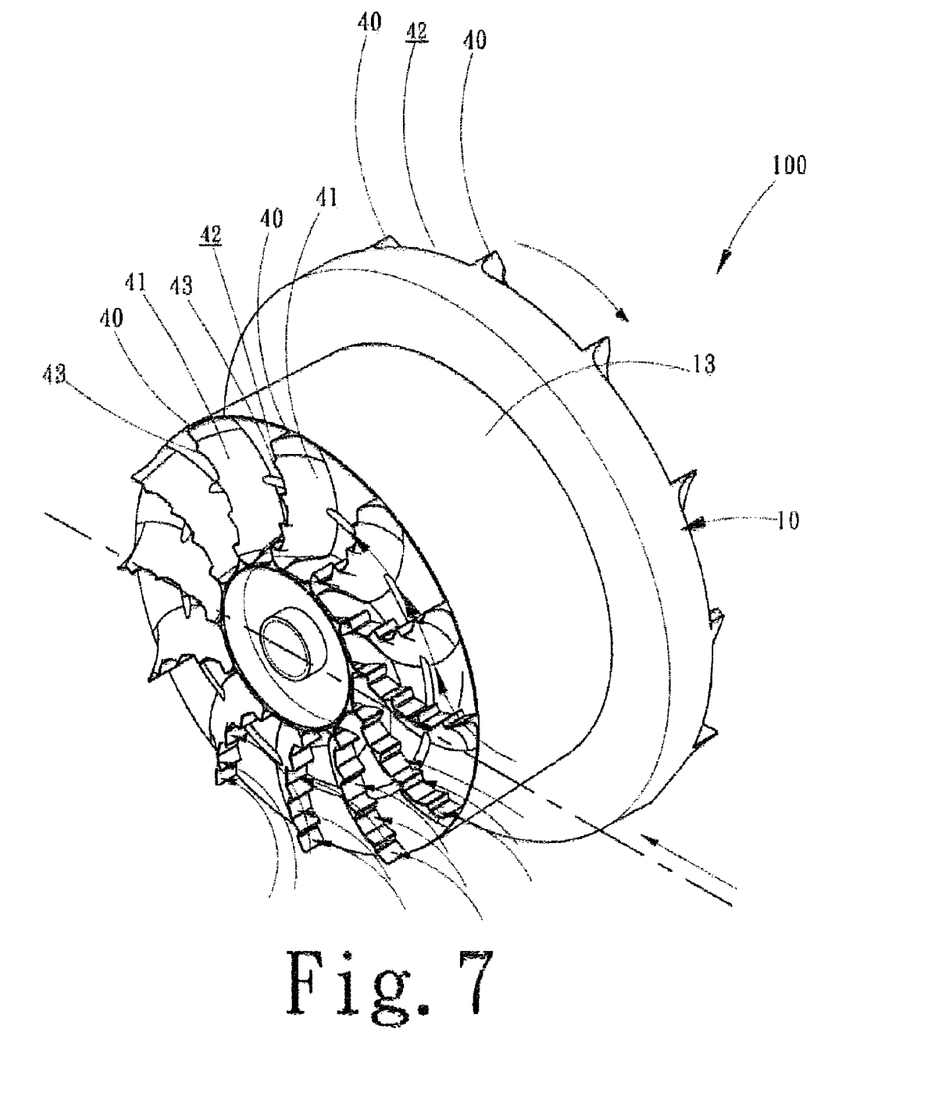
FIG. 7 is another perspective view of FIG. 6.
Figure 8:
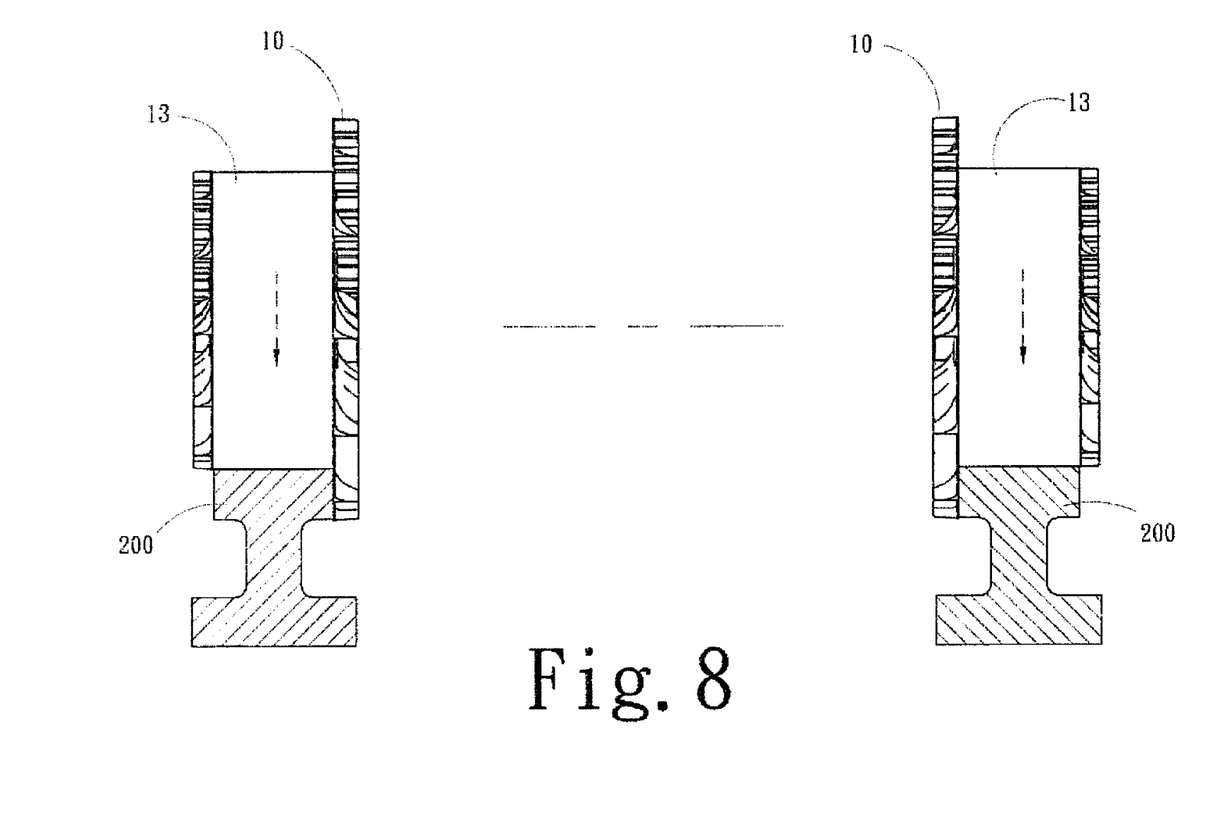
FIG. 8 is a front view illustrating a surface of a body of FIGS. 6 and 7 in contact with a rail.

Referring to FIGS. 6-8, a tire/wheel structure constructed in accordance with a third embodiment of the present invention, also designated at 100, is shown, in which the body 10 is a metal wheel of a train. The body 10 has opposite sidewalls on each of which a plurality of guide blocks 40 is formed. The guide blocks 40 are each provided with, on a side thereof facing a forward rotation direction of the body 10, with at least one inclined guide face 41 in such a way that the inclined guide face 41 and an adjacent one of the guide blocks 40 define therebetween a wind-assisting grooves 42. Each of the guide blocks 40 has a rear side forming a plurality of wind assisting protrusion 43*s*, which multiple sections of surface area and an associated effect for wind-assisted driving. Similarly, as shown in FIG. 8, when the tread surface 13 of the body 10 is brought into contact with a rail 200 and is in a forward rotating condition (as indicated by the arrows of FIG. 8), the inclined guide faces 41 of the guide blocks 40, together with the wind-assisting grooves 42 and the wind assisting protrusions 43, help enhance airflow guide, reduce wind resistance, and generate an assistive driving force (as indicated by arrows of FIGS. 6 and 7). In an application of a loop-like railway system where movement of a train in made in a uni-directional manner, for a long-term operation of the train, the fuel consumption or power consumption of the train can be greatly lowered down to achieve an effective result of energy saving and carbon reduction.

Figure 9:
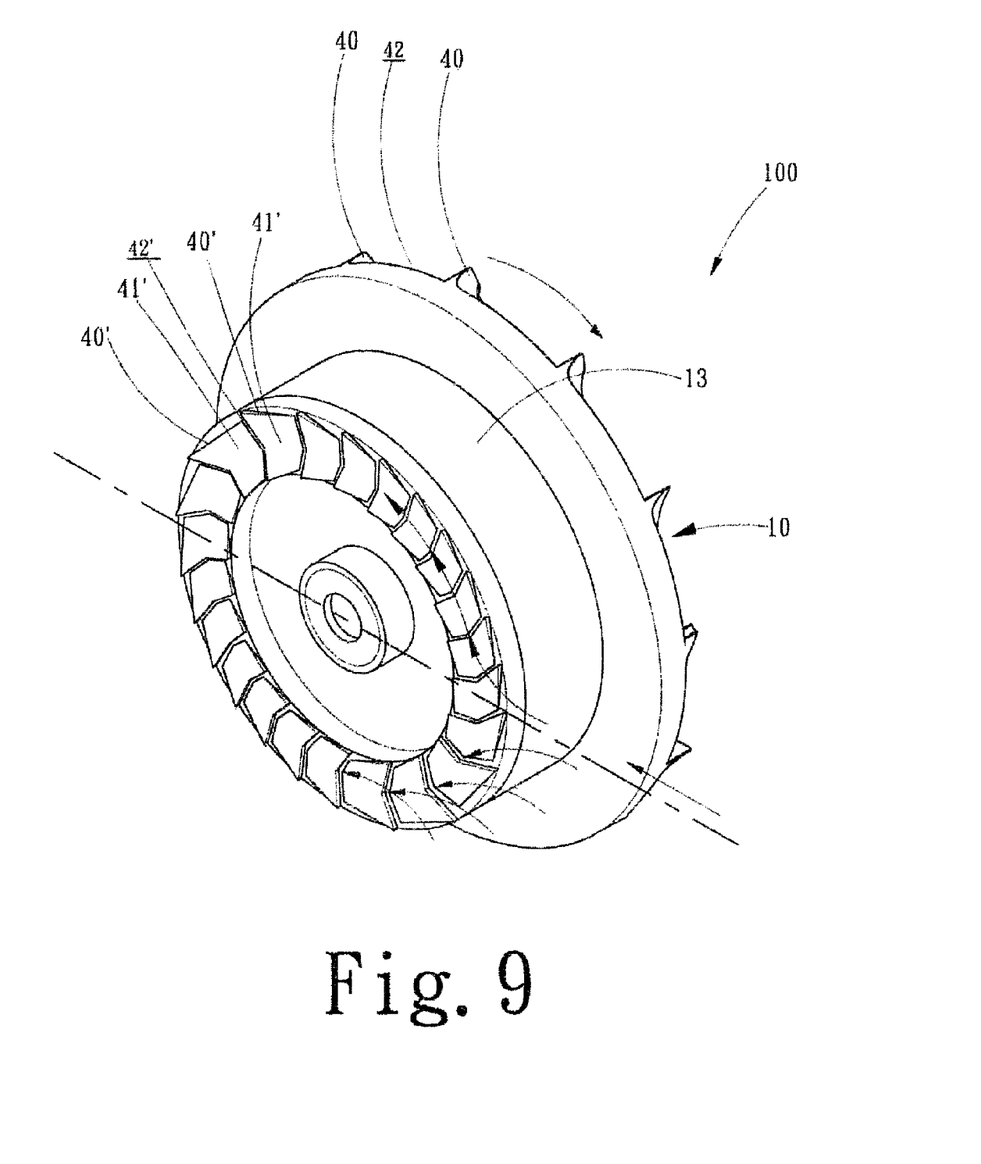
FIG. 9 is a perspective view showing a fourth embodiment of the present invention.

Referring to FIG. 9, a tire/wheel structure constructed in accordance with a fourth embodiment of the present invention, also designated at 100, is shown, in which the guide blocks 40' are made in the form of an arrow-like configuration to be mounted to an outer sidewall of the body 10 in the form of a train metal wheel shown in FIGS. 6-8 and are arranged in a single series and in a one-by-one neighboring manner on the outer sidewall of the body 10. Each of the guide blocks 40' is provided, on a side thereof facing the forward rotation direction of the body 10, with at least one inclined guide face 41', such that the inclined guide face 41' of each of the guide blocks 40' and an adjacent one of the guide blocks 40' define therebetween a wind-assisting groove 42' to provide multiple sections of surface area and an associated effect for wind-assisted driving.

The tire/wheel structure 100 according to the present invention, as shown in FIGS. 1-9, when applied to a vehicle, such as a motorcycle, an automobile, and a train, can allow the vehicle, such as a motorcycle, an automobile, and a train, to enhance airflow guide of the body 10, reduce wind resistance of the body 10, and generate an assistive driving force in moving forwards by means of the guide blocks 20, 30, 30', or 40 and the first ancillary guide blocks 211, the second ancillary guide blocks 212, and the inclined guide faces 22, 31, 31', or 41, 41', the inclined guide faces 211a, the inclined guide faces 212a, the wind-assisting grooves 23, 32, 32' or 42, 42', and the wind assisting protrusions 33 and 43, so as to greatly lower down the fuel consumption or power consumption of the motorcycle, the automobile, and train, whether it is new or old. A bettered effect of energy saving can be achieved for an increased diameter of the body 10. Further, the tire/wheel structure 100 of the present invention is applicable to a man-powered vehicle, such as a bicycle, to achieve an effect of move-assistance, effort saving, and movement stabilization.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A tire structure, comprising:
   a body having a circumferential surface extending transversely between two sidewalls; and
   a plurality of guide blocks disposed on at least one of the two sidewalls of the body in a cascade series and arranged in an aligned manner about a circumferential direction, each of the guide blocks extending radially from a circumferential edge of the sidewall, each of the guide blocks having a leading portion and a trailing portion, the leading portion of each of the guide blocks facing a forward rotation direction of the body and forming at least one inclined guide face, the at least one inclined guide face defining an undulating contour along a radial direction, the at least one inclined guide face and the trailing portion of an adjacent one of the guide blocks defining therebetween a wind-assisting groove,
   whereby when the body rotates in the forward rotation direction, the inclined guide faces of the guide blocks and the wind-assisting grooves are configured to aerodynamically deflect oncoming air when the leading portion faces forward to minimize wind resistance during body rotation, and the trailing portions are configured to be driven by the oncoming air when the leading portion faces rearward during body rotation.

2. The tire structure as claimed in claim 1, wherein the body comprises a plurality of tread blocks formed on the circumferential surface thereof, the tread blocks and the guide blocks collectively defining therebetween assistive airflow channels.

3. The tire structure as claimed in claim 2, wherein each of the assistive airflow channels comprises first ancillary guide blocks and second ancillary guide blocks arranged therein, the first ancillary guide blocks and the second ancillary guide blocks each having a side facing the forward rotating direction of the body and forming an inclined guide face.

4. The tire structure as claimed in claim 1, wherein the guide blocks have opposing concave and convex sides.

5. The tire structure as claimed in claim 1, where the inclined guide faces of the guide blocks are curved slopes.

\* \* \* \* \*